(12) United States Patent
Hodak

(10) Patent No.: US 10,458,137 B1
(45) Date of Patent: Oct. 29, 2019

(54) POOL SKIMMER OPENING CLOSURE DEVICE AND METHOD

(71) Applicant: Jerry Hodak, Zelienople, PA (US)

(72) Inventor: Jerry Hodak, Zelienople, PA (US)

( * ) Notice: Subject to any disclaimer, the term of this patent is extended or adjusted under 35 U.S.C. 154(b) by 0 days.

(21) Appl. No.: 15/700,765

(22) Filed: Sep. 11, 2017

Related U.S. Application Data

(60) Provisional application No. 62/385,323, filed on Sep. 9, 2016.

(51) Int. Cl.
*E04H 4/12* (2006.01)
*C02F 1/40* (2006.01)
*C02F 103/42* (2006.01)

(52) U.S. Cl.
CPC ............. *E04H 4/1272* (2013.01); *C02F 1/40* (2013.01); *C02F 2103/42* (2013.01)

(58) Field of Classification Search
CPC .................................................. E04H 4/1272
USPC .......................................... 4/496, 252.11, 507
See application file for complete search history.

(56) References Cited

U.S. PATENT DOCUMENTS

| | | |
|---|---|---|
| 4,281,422 A | 8/1981 | Simonelli |
| 4,454,035 A | 6/1984 | Stefan |
| 4,913,810 A | 4/1990 | Hodak |
| 5,285,538 A | 2/1994 | Hodak |
| 5,604,939 A * | 2/1997 | Widener ............... E04H 4/1272 4/496 |
| 6,578,208 B1 | 6/2003 | Lytle |
| 6,966,078 B2 * | 11/2005 | Evans ................... E04H 4/1272 4/496 |
| 7,390,401 B2 | 6/2008 | Hodak |
| 7,413,651 B2 | 8/2008 | Hodak |
| 8,382,977 B1 * | 2/2013 | Jones .................... E04H 4/1272 210/167.18 |
| 8,793,820 B2 | 8/2014 | Hodak |
| 9,133,638 B2 | 9/2015 | Hodak |
| 2011/0296601 A1 * | 12/2011 | Hodak .................. E04H 4/1272 4/295 |
| 2015/0052674 A1 * | 2/2015 | Mewett .................... E04H 4/14 4/507 |

FOREIGN PATENT DOCUMENTS

WO 2017127482 7/2017

* cited by examiner

*Primary Examiner* — Lauren A Crane
(74) *Attorney, Agent, or Firm* — AP Patents

(57) ABSTRACT

A device that selectively closes an inlet opening in a face frame of a throat in a pool skimmer, the throat having an outlet opening in a wall of a chamber of the pool skimmer, the throat being in a water flow communication with the chamber, the chamber accessible through a removable lid, the device comprises a body sized larger than the inlet opening, a support member sized and shaped to be positioned, during use of the device, in a contact with the wall of the chamber and adjacent the outlet opening of the throat, and an elastic member being in a first connection with the body and in a second connection with the support member, the elastic member further being in a tension during use of the device.

21 Claims, 13 Drawing Sheets

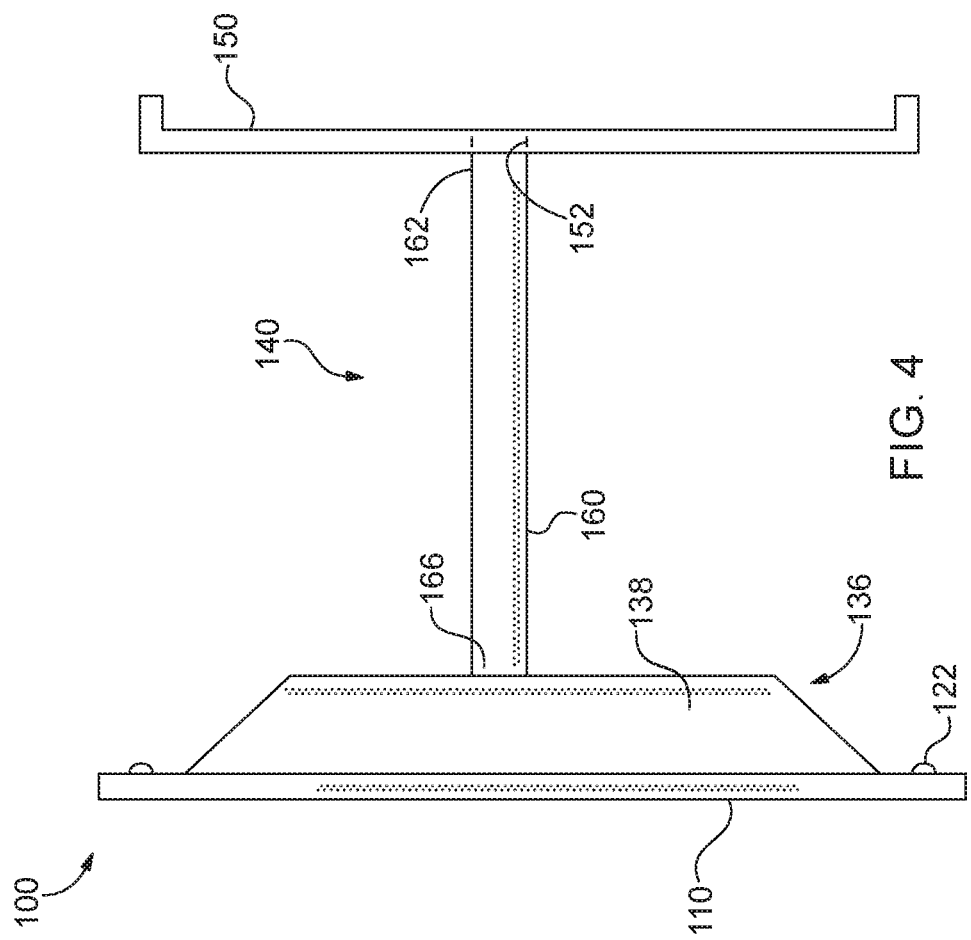

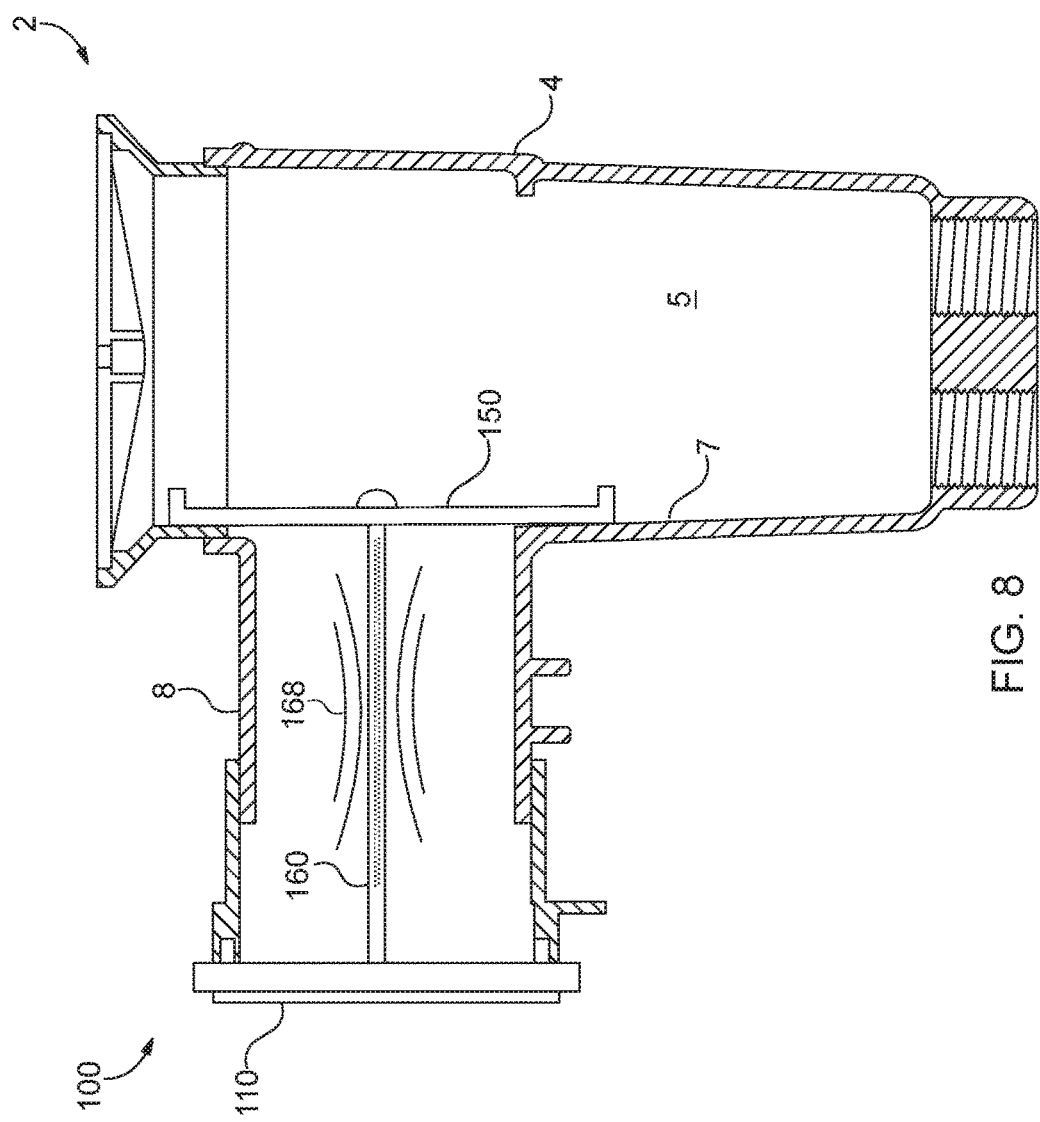

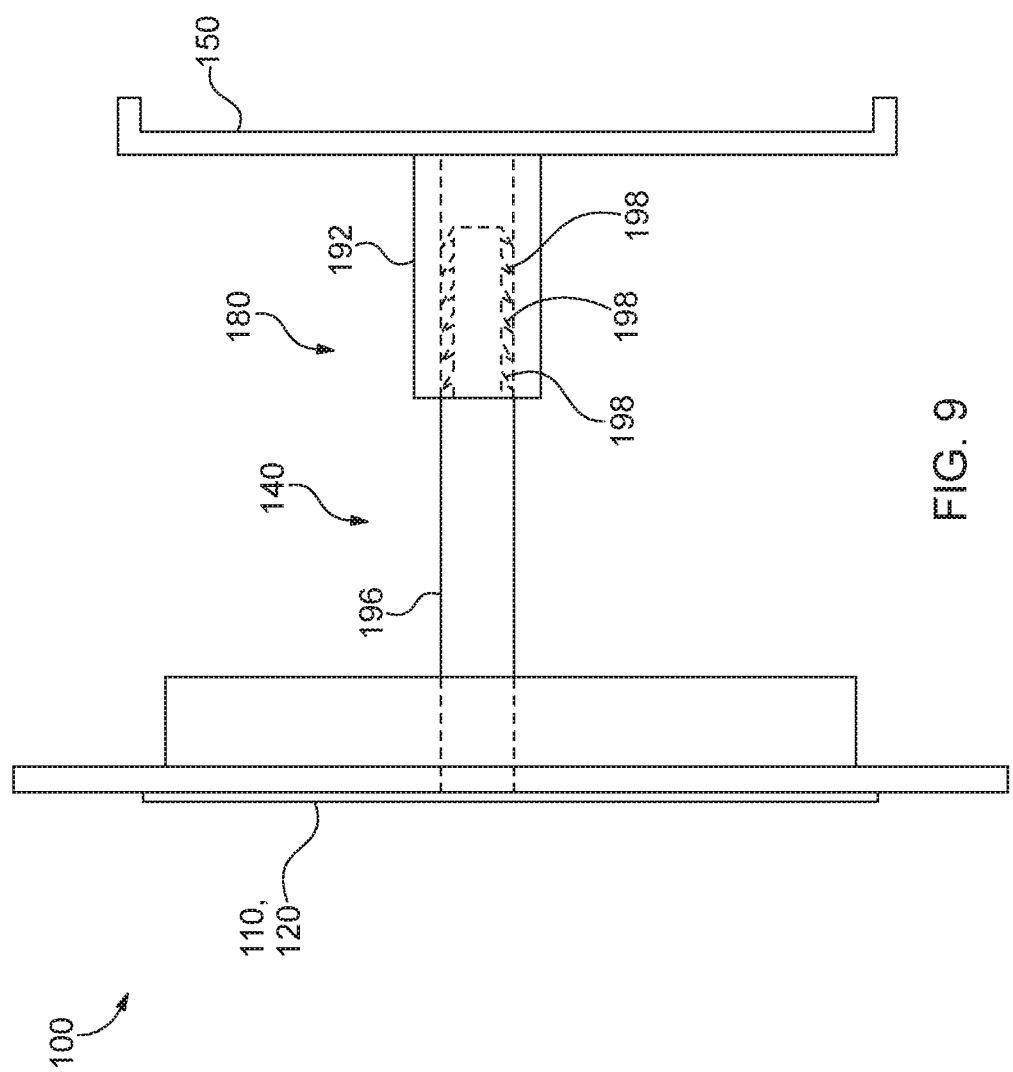

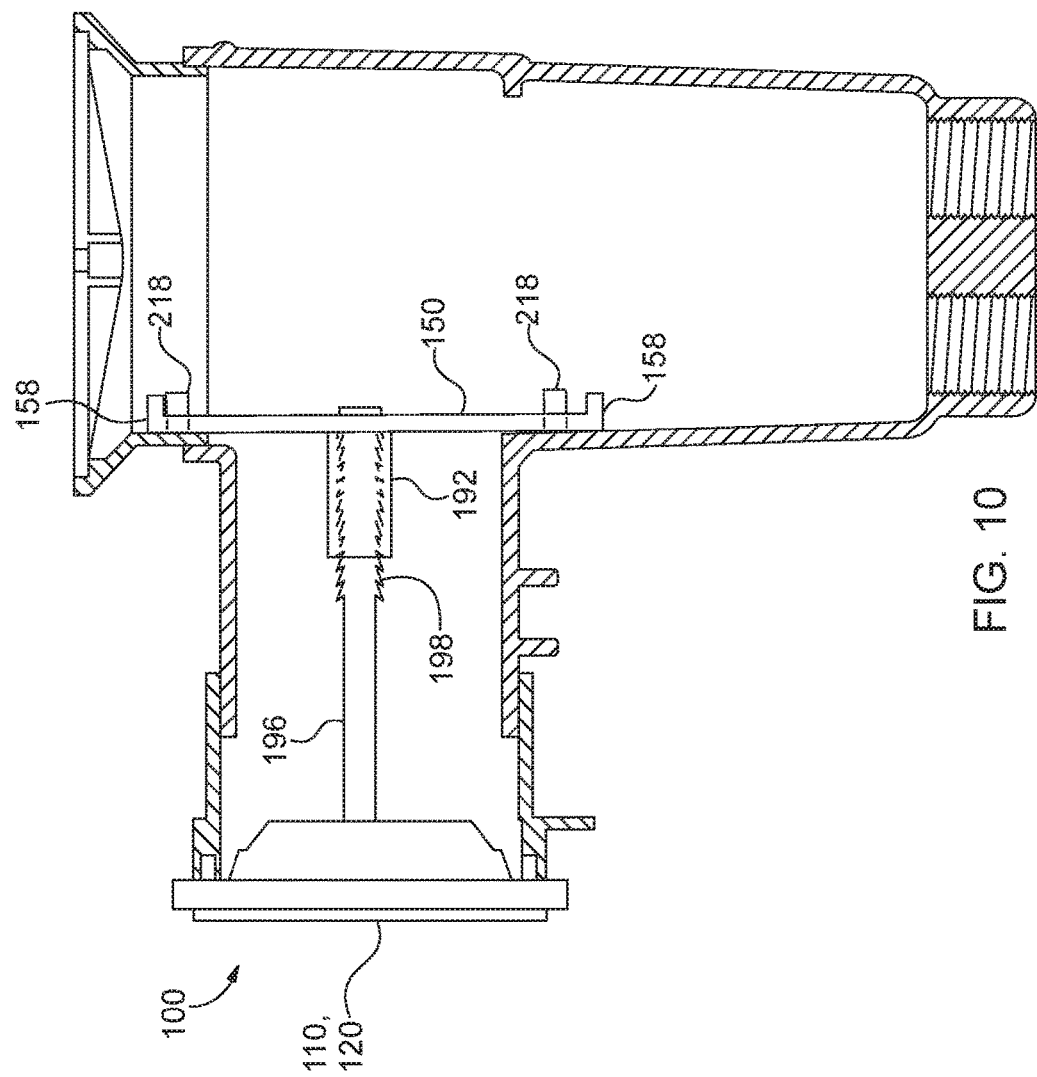

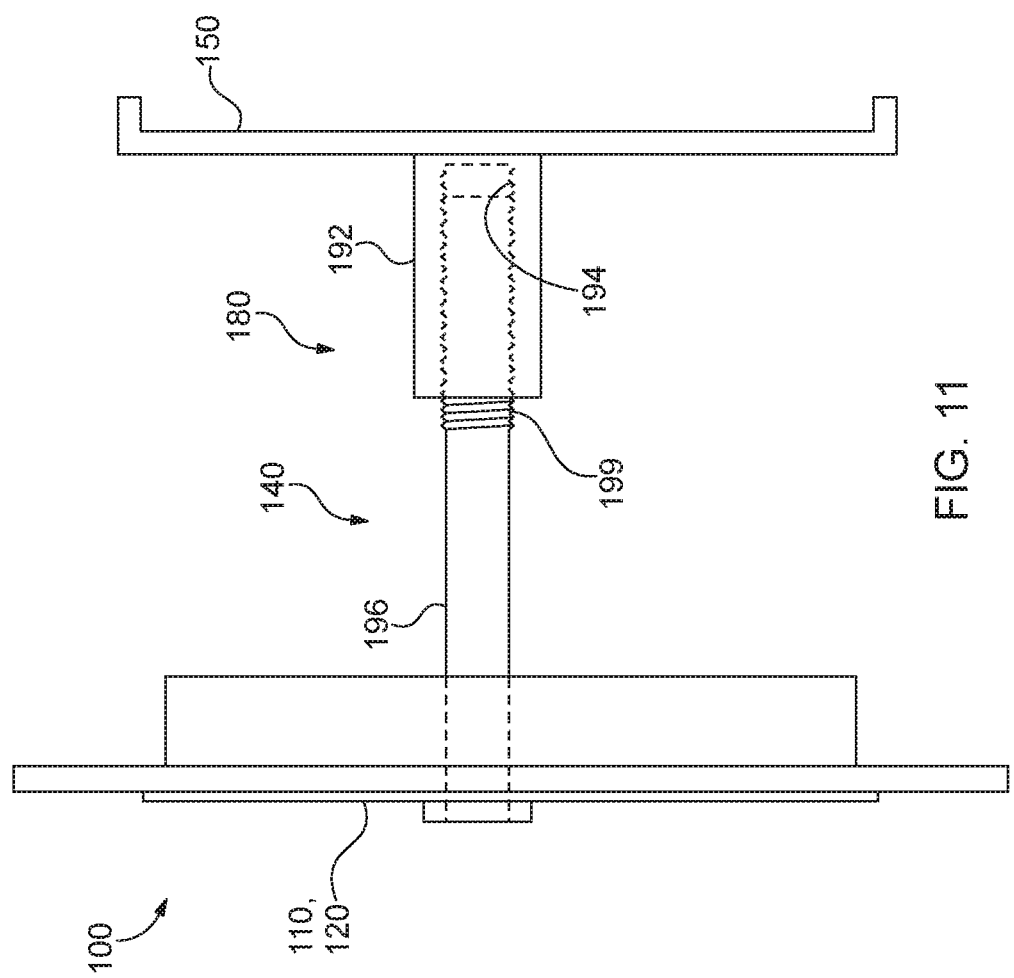

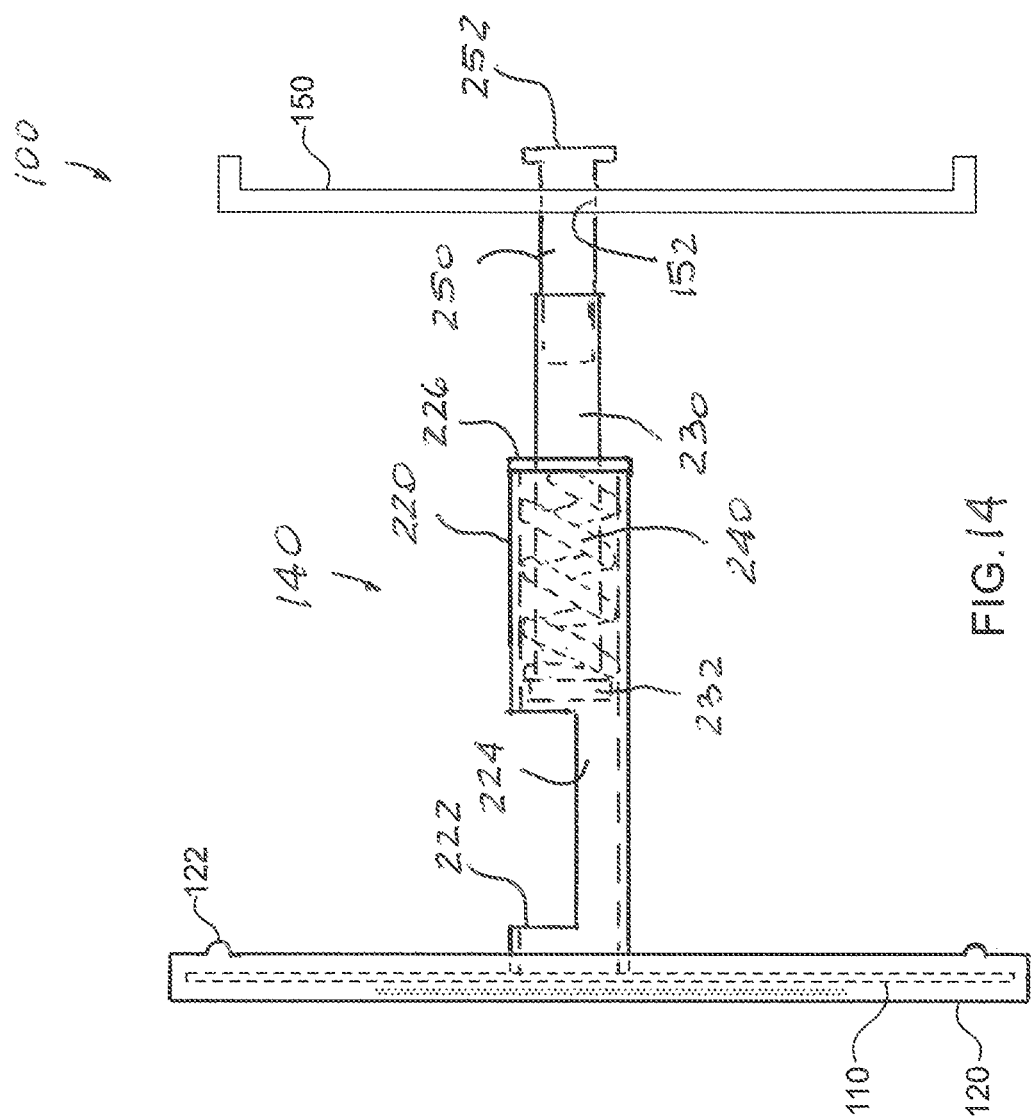

POOL SKIMMER OPENING CLOSURE DEVICE AND METHOD

CROSS-REFERENCE TO RELATED APPLICATIONS

This present nonprovisional application is related to and claims benefit of and priority from U.S. Provisional Patent Application Ser. No. 62/385,323 filed on Sep. 9, 2016, the entire contents of which are hereby incorporated by reference thereto.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND

1. Technical Field

The subject matter relates to swimming pools. It further relates to winterizing or servicing a swimming pool skimmer using a skimmer opening closure device.

2. Description of Related Art

The following background information may present examples of specific aspects of the prior art (e.g., without limitation, approaches, facts, or common wisdom) that, while expected to be helpful to further educate the reader as to additional aspects of the prior art, is not to be construed as limiting the present subject matter, or any embodiments thereof, to anything stated or implied therein or inferred thereupon.

Conventionally, pool skimmers are employed with both in-ground and above-ground swimming pools to circulate and clean pool water. Pool skimmers comprise an inlet opening that must be closed during winter months so as to prevent freezing due to undesirable water flow into the pool skimmer.

Some closure devices presently in use require use of fasteners or additional intermediate components for a snap-on connection between the closure device and the face frame of the pool skimmer.

Some closure devices presently in use can be installed without use of fasteners but are generally configured to a specific inlet opening size, thus requiring production of a great variety of closure devices due to multiplicity of inlet opening sizes. Furthermore, some of these closure devices may shrink in size during use and allow some water flow into the pool skimmer.

BRIEF DESCRIPTION OF THE DRAWINGS

The accompanying drawings are incorporated in and constitute part of the specification and illustrate various embodiments. In the drawings:

FIG. 4 illustrates an elevation view of an exemplary device configured to close the inlet opening of the swimming pool skimmer;

FIG. 8 illustrates an elevation view of the exemplary device of FIGS. 2-6 installed in the exemplary swimming pool skimmer of FIG. 1, shown in a cross-section;

FIG. 9 illustrates an elevation view of an exemplary device configured to close the inlet opening of the swimming pool skimmer;

FIG. 10 illustrates an elevation view of the exemplary device of FIG. 9 installed in the exemplary swimming pool skimmer of FIG. 1, shown in a cross-section;

FIG. 11 illustrates an elevation view of an exemplary device configured to close the inlet opening of the swimming pool skimmer;

FIG. 14 illustrates an elevation view of an exemplary device configured to close the inlet opening of the swimming pool skimmer.

DETAILED DESCRIPTION OF EXEMPLARY EMBODIMENTS

Figure 1:
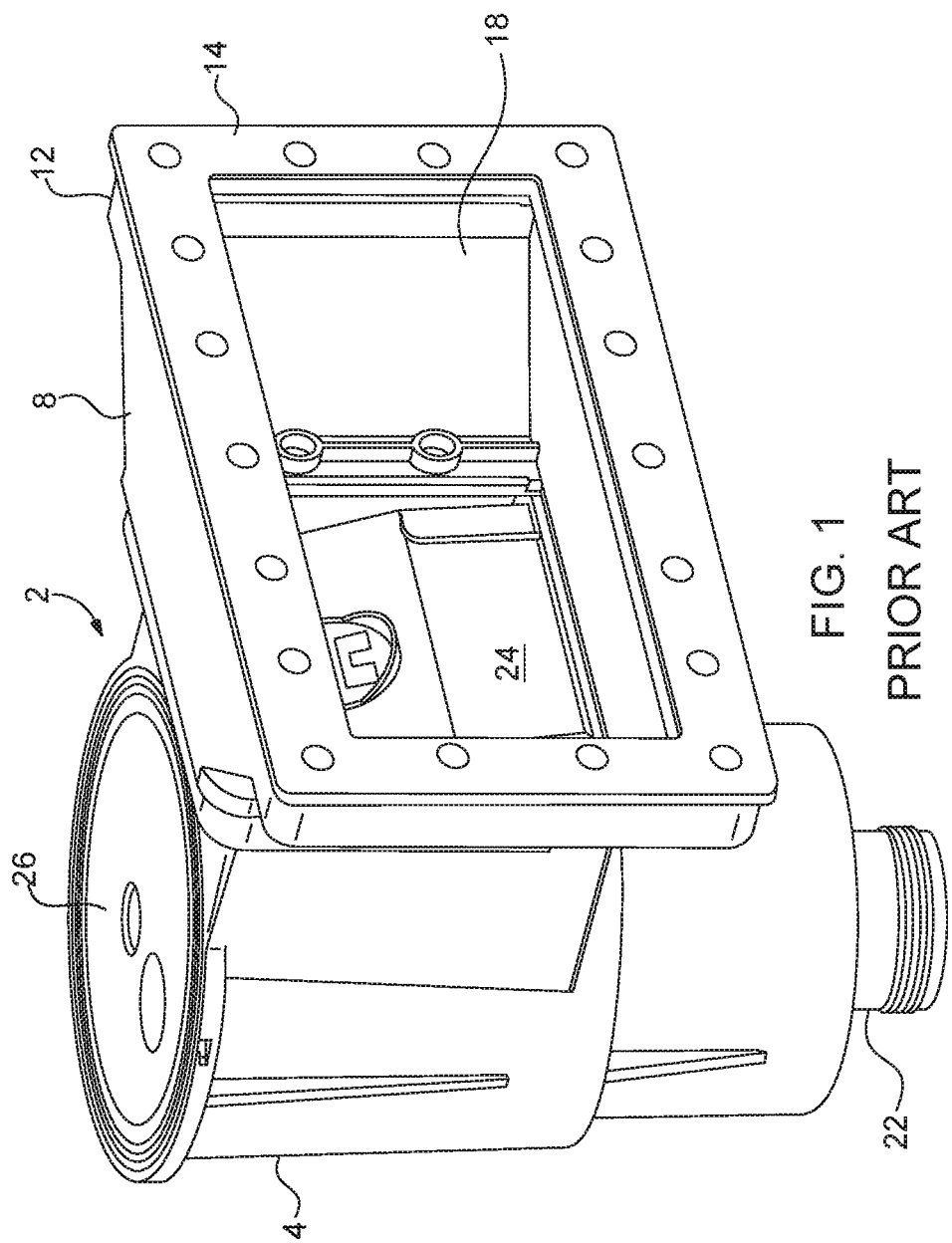
FIG. 1 illustrates a 3-D view of an exemplary swimming pool skimmer presently in use and labeled "Prior Art"

Prior to proceeding to the more detailed description of the present invention, it should be noted that, for the sake of clarity and understanding, identical components which have identical functions have been identified with identical reference numerals throughout the several views illustrated in the drawing figures.

The following detailed description is merely exemplary in nature and is not intended to limit the described examples or the application and uses of the described examples. As may be used herein, the words "example", "exemplary" or "illustrative" means "serving as an example, instance, or illustration." Any implementation described herein as "example", "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

References in the specification to "one embodiment", "an embodiment", "an exemplary embodiment", "another embodiment", "a presently preferred embodiment", "an alternative embodiment", "one variation", "a variation" and similar phrases mean that a particular feature, structure, or characteristic described in connection with the embodiment or variation, is included in at least an embodiment or variation of the invention. The phrase "in an embodiment", "in one variation" or similar phrases, as may be used in various places in the specification, are not necessarily meant to refer to the same embodiment or the same variation.

For purposes of description herein, the directional and/or relationary terms such as "upper", "top", "lower", "bottom", "left", "right", "rear", "back", "front", "apex", "vertical", "horizontal", "lateral", "exterior", "interior" and derivatives thereof are relative to each other and are dependent on the specific orientation of an applicable element or article, and are used accordingly to aid in the description of the various embodiments and are not necessarily intended to be construed as limiting. It will be understood that the spatially relative terms are intended to encompass different orientations of the device in use or operation in addition to the orientation depicted in the figures. For example, if the device in the figures is Over, elements described as "below" "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The term "or" when used in this specification is not meant to be exclusive; rather the term is inclusive, meaning either or both.

The term "couple" or "coupled", when used in this specification, refers to an indirect or direct physical connection between the identified elements, components, or objects. Often the manner of the coupling will be related specifically to the manner in which the two coupled elements interact.

The term "directly coupled" or "coupled directly," when used in this specification, refers to a physical connection between identified elements, components, or objects, in which no other element, component, or object resides between those identified as being directly coupled.

The terms "removable", "removably coupled", "removably disposed," "readily removable", "readily detachable", "detachably coupled", "separable," "separably coupled," and similar terms, when used in this specification, refer to structures that can be uncoupled, detached, uninstalled, or removed from an adjoining structure with relative ease (i.e., non-destructively, and without a complicated or time-consuming process), and that can also be readily reinstalled, recoupled, or coupled to the previously adjoining structure.

As may be used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer, or section from another element, component, region, layer or section. Thus, "a first element," "component," "region," layer, or "section" discussed below could be termed a second element, component, region, layer, or section without departing from the teachings herein.

Spatially relative terms, such as "beneath," "below," "lower," "above," "upper," and the like, may be used herein for ease of description to describe one element or feature s relationship to another element(s) or feature(s) as illustrated in the figures. It will be understood that the spatially relative terms are in-tended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated. 90 degrees or at other orientations) and the spatially relative descriptors used herein interpreted accordingly.

The terms and words used in the following description are not limited to the bibliographical meanings, but, are merely used by the inventor to enable a clear and consistent understanding of the invention. Accordingly, it should be apparent to those skilled in the art that the following description of exemplary embodiments of the present disclosure are provided for illustration purpose only and not for the purpose of limiting the present disclosure.

It is to be understood that the singular forms "a," "an," and "the" include plural referents unless the context clearly dictates otherwise. Thus, for example, reference to "a component surface" includes reference to one or more of such surfaces.

The particular embodiments of the present disclosure generally provide device and method for winterizing or servicing a swimming pool skimmer using a skimmer inlet opening closure device.

In all embodiments, the device comprises a body or a face plate sized and shaped to cover an inlet opening in a face frame of a throat in the swimming pool skimmer and a means for biasing or contacting, during the use of the device and in fastener-free manner between the body and the face frame, the body with the face frame.

In particular embodiments, the device comprises a body sized to cover or close the skimmer inlet opening, an elastomeric material at least partially encasing the body and a mounting member configured to positively attach the body in a position to cover the skimmer inlet opening.

In particular embodiments, the polymer can be any one of a naturally occurring rubber, a synthetic material and a combination thereof.

Now in a reference to drawings, FIG. 1, illustrates an exemplary conventional swimming pool skimmer 2 that can be used with in-ground or above-ground swimming pools for regulating the flow of water from the upper surface of the pool and the main pool drain (not shown) to an externally located pump-filter assembly (not shown), for circulating and cleaning the water. The swimming pool skimmer 2 generally comprises a housing 4 with an internal chamber 5 defined by a peripheral wall 6. An inner surface 7 of the wall 6 also defines an inner surface of the chamber 5. A box-like throat portion 8 extends from an upper portion of the housing 4 and has a hollow interior 10. The throat 8 comprises a pool facing end 12 that is generally terminated by a face frame or face plate 14 with an exterior surface 16. The pool facing end 12 defines an inlet opening 18 of the throat 8, which can be within the frame 14. Throat 8 also comprises an outlet opening 20 which is essentially provided in the wall 6 of the housing 4. Thus, the throat 8 is being in a water flow communication with the chamber 5. A conduit connection or a drain 22 is provided at the bottom of the housing 4 in a fluid flow cooperation with the chamber 5. A debris basket (not shown) is mounted within a lower portion of the chamber 5 above the conduit connection 22. A floating weir 24 is installed within the throat 8 and is generally used during pool operation to regulate the flow through the pool skimmer 2 and prevent backward flow of the debris. The weir 24 is generally removed prior to pool winterization efforts. A removable lid 26 selectively covers and uncovers a top end of the swimming pool skimmer 2 for access into the chamber 5 and cleaning of the debris basket (not shown). During normal operation, the water and debris flow into the hollow interior 10 through the inlet opening 18 and then into the chamber 5 through the outlet opening 20. The pool water will then flow through the conduit connection 22 and the conduit (not shown) into filtration equipment (not shown), whereupon the water will be returned to the swimming pool (not shown) by a return conduit (not shown) that registers with the swimming pool side wall at a lower position and some distance from the pool skimmer 2. Debris carries by the flowing water collect in the debris basket (not shown).

Now in a further reference to the drawings, FIGS. 2-14, illustrate exemplary embodiments of the device 100 that selectively closes the inlet opening 18 for winterizing or servicing the swimming pool skimmer 2. Furthermore, the device 100 is also configured to seal the inlet opening 18 so as to eliminate water flow into the chamber 5 during winter months. In all embodiments, the device 100 comprises a body 110. The body 110 can be also referred as a face plate. When the device 100 is installed for use, the body 110, that can be provided as a plate-shaped member, defines a face of the pool skimmer 2. The body 110 can be sized larger than the peripheral edge of the inlet opening 18. The body 110 can be even sized larger than the face frame or faceplate 14 so that a single body 110 can be used on inlet openings 18 of different sizes.

The body 110 defines a peripheral edge 112, an inner surface 114, that faces or is positioned against the exterior surface 16, and an outer surface 116, spaced apart from the inner surface 114 to define a thickness of the body 110. Although the body 110 has been illustrated as comprising a uniform thickness throughout the body 110, the thickness can vary through portions of the body 110. In other words, it is not necessary for the inner surface 114 or the outer surface 116 to be flat surfaces. The body 110 can comprise different materials. The body 110 can be manufactured from an elastomeric material, for example such as rubber, silicon or the like so as to be also configured as a seal. The body 110 can be manufactured from a metallic and/or plastic materials.

The device 100 can also comprises a sealing member 120. The sealing member 120 comprises material that enacts sealing properties between the body 110 and the face frame 14 after installation and during use of the device 100. The sealing member 120 can be operable to seal a coupling between the body 110 and the face frame 14 and at least prevent if not completely eliminate water infiltration into the hollow interior 10 of the throat 8. The sealing member 120 can be even operable to seal a coupling between the body 110 and a surface of the swimming pool (not shown) to at least prevent if not completely eliminate water infiltration into the hollow interior 10 of the throat 8. The sealing member 120 can comprise a polymeric material. Such polymeric material can be an elastomer. Although the sealing member 120 has been illustrated in various figures as comprising a rubber, the sealing member 120 can comprise any other material suitable to at least prevent if not completely eliminate water infiltration into the hollow interior 10 of the throat 8. The sealing member 120 can be a thermoset elastomer, a thermoplastic elastomer and a combination thereof. In a non-limited example, such material can be a silicone. During use, at least a portion of the sealing member 120 is positioned to directly abut the exterior surface 16 or contact surface of the swimming pool (not shown).

Figure 2:
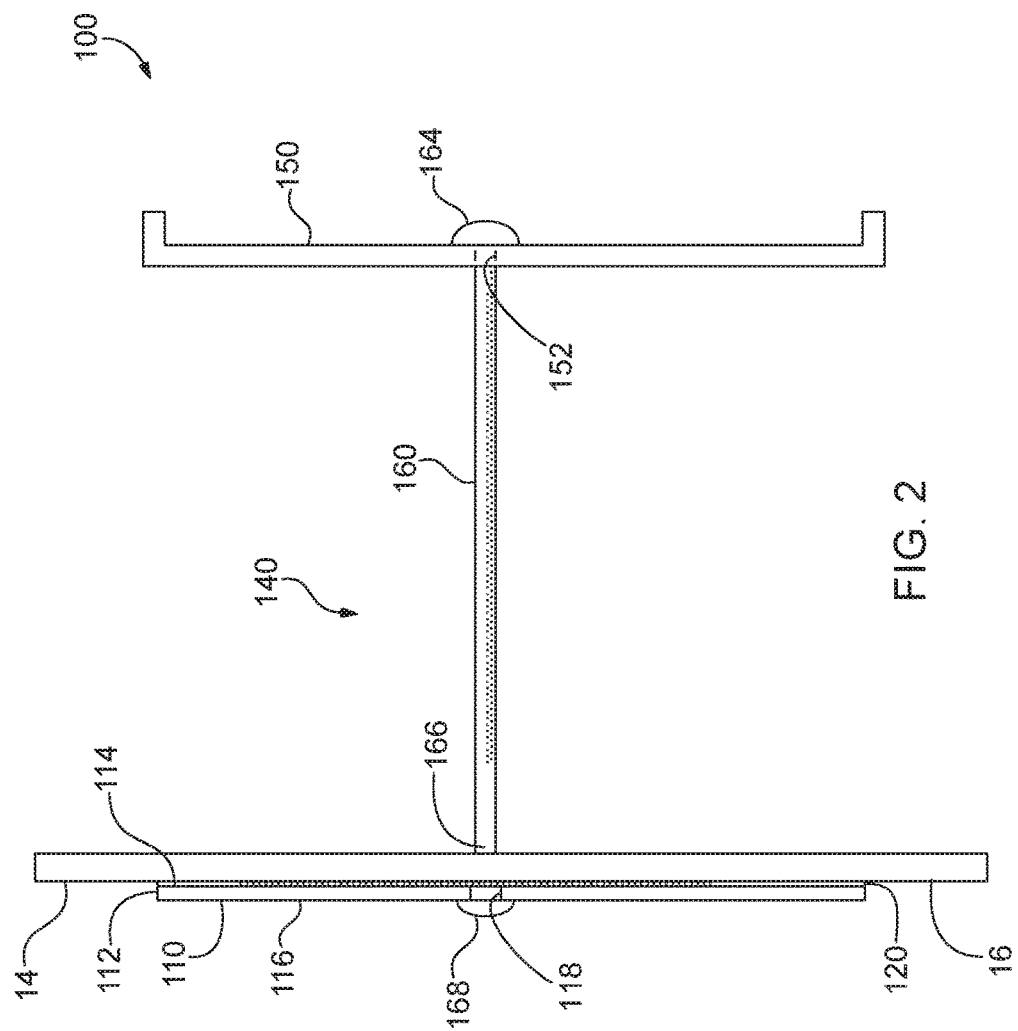
FIG. 2 illustrates an elevation view of an exemplary device configured to close the inlet opening of a swimming pool skimmer.

In an embodiment of FIG. 2, the sealing member 120 can be simply positioned between an inner surface 114 and the exterior surface 16 during installation. In other words, the sealing member 120 can be provided as a separate gasket, either being sized to close the entire inlet opening 18 or provided as a hollow frame sized and shaped to surround the inlet opening 18 and contact a peripheral portion of the exterior surface 16 around the inlet opening 18.

In an embodiment, the sealing member 120 can be attached to the body 110 either in a permanent or a detachable manner. In an example of FIGS. 3-4, such sealing member 120 can be provided as a length of an extrusion or as a hollow frame-shaped member 122 being attached to the inner surface 114 prior to installation of the device 100. The sealing member 122 can define a hollow frame-shaped bead on the interior surface 114. The peripheral frame-shaped 122 functions as a seal. The sealing member 122 can define a simple peripheral bead on the peripheral edge 112. The sealing member 122 can be attached by way of an adhesive (not shown).

Figure 5A:
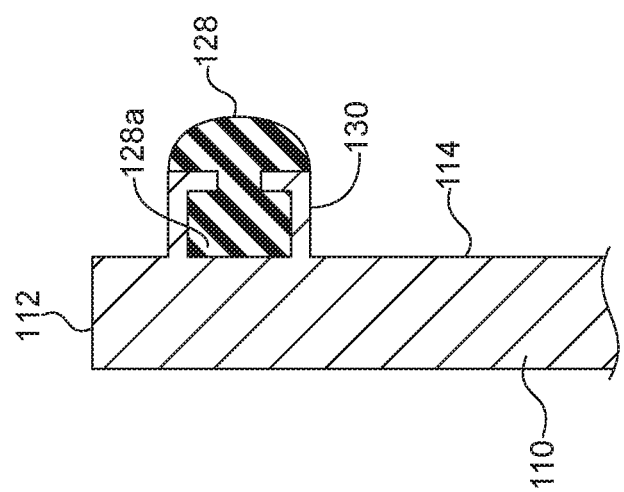
FIGS. 5A-5C illustrate exemplary partial cross-sectional views of a sealing member that can be used in the devices.

In an example of FIG. 5A, the sealing member 120 can be provided as a sealing member 124 that defines a generally U-shaped cross-section and a cavity 124a that is sized and shaped to receive the peripheral edge 112 and surface portions of the body 110. The sealing member 124 can be provided as an extrusion and wrapped around the peripheral edge 112 of the body 110 prior to installation of the device 100. The seam (not shown) between the abutting ends of the sealing member 124, provided as an extrusion, can be sealed with an adhesive. The sealing member 124 can be also molded as a hollow frame and attached onto the body 110 by temporarily stretching the sealing member 124 during installation to seat the peripheral edge 112 into the cavity 124a. It is not necessary for the sealing member to be symmetrical about the thickness of the body 110 and a mass of such sealing member 124 can be skewed or biased toward the inner surface 114 to enhance sealing of the inlet opening 18 during use of the device 100 and/or to compensate for manufacturing tolerances and aging of the member 120.

Figure 5B:
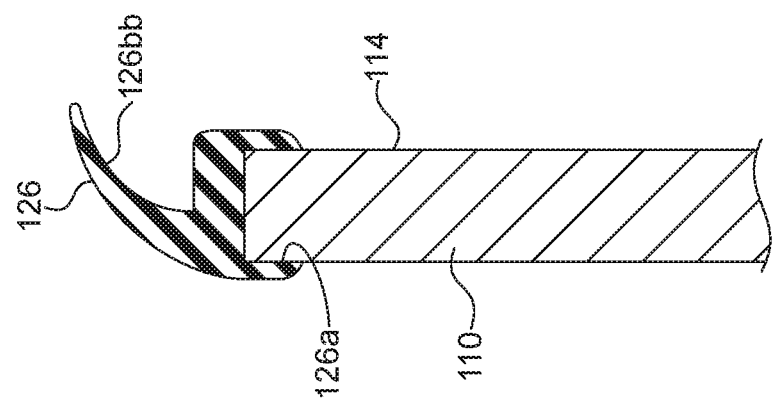

In an example of FIG. 5B, the sealing member 120 can be provided as a sealing member 126 that defines a cavity 126a that is sized and shaped to receive the peripheral edge 112 and surface portions of the body 110 and a lip 126b that abuts the exterior surface 16 during use. The sealing member 126 can be provided as an extrusion and wrapped around the peripheral edge of the body 110 prior to installation, particularly when each corner of the body 110 comprises a taper or a curved portion. Again, the seam (not shown) between the abutting ends of the member 126, provided as an extrusion, can be sealed with an adhesive. The sealing member 126 can be also molded as a hollow frame and attached onto the body 110 by temporarily stretching the member 126 during installation to seat the peripheral edge 112 into the cavity 126a. The sealing member 126 can be sized so that the lip 126b contacts the surface of the swimming pool (not shown) around the face frame 14.

Figure 5C:
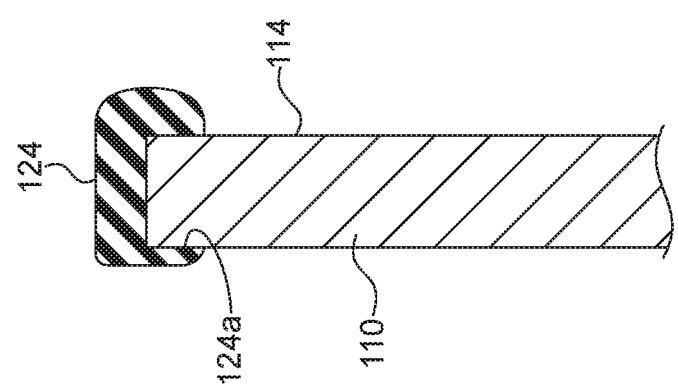

In an example of FIG. 5C, the sealing member 120 can be provided as a sealing member 128 that defines a base portion 128a being shaped and sized to be received within a seat 130 provided on the inner surface 114 of the body 110. The seat 130 can be provided as a one-piece construction with the body 110, for example by a molding process, or can be provided as a separate member and attached to the interior surface 114, for example by way of an adhesive (not shown). The sealing member 128 can be provided as an extrusion. Again, the seam (not shown) between the abutting ends of the sealing member 128, provided as an extrusion, can be sealed with an adhesive. The sealing member 128 can be also molded as a hollow frame with the base portion 128A being inserted into the seat 130 by way of a compression.

On any of the above described examples of FIGS. 3-5C, the sealing member 120 can be attached by way of a molding process.

Figure 3:
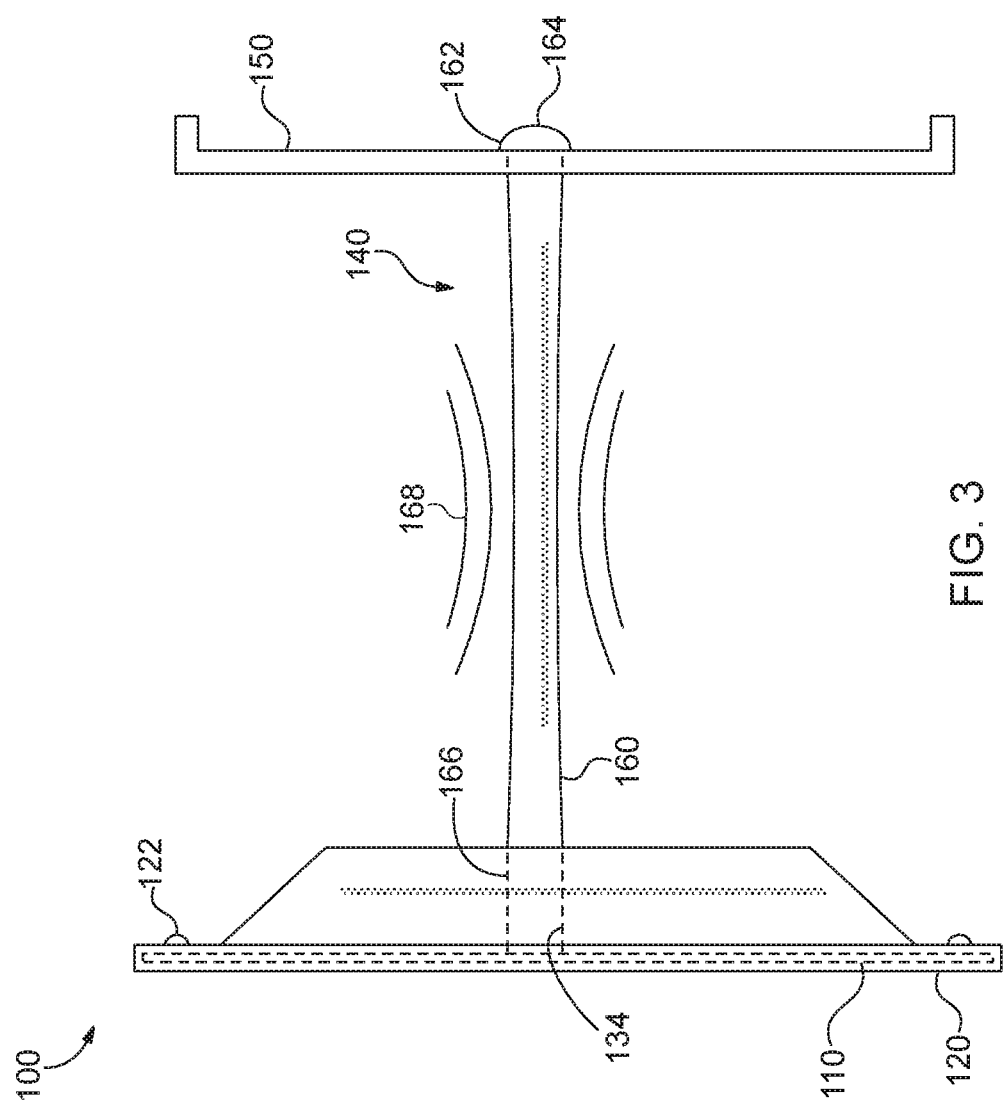
FIG. 3 illustrates an elevation view of an exemplary device configured to close the inlet opening of the swimming pool skimmer.

In an embodiment of FIG. 3, the sealing member 120 can completely encase the body 110, for example during a molding process. In this embodiment, the sealing member 120 can be also provided with the (optional) peripheral bead 122 to function as the seal or with any of the features of FIGS. 5A-5C. In this embodiment, the body 110 can be referred to as a base. In this embodiment, the body 110 does not have to be provided as a solid member and can have through apertures or being even provided as a plurality of individual portions. In this embodiment, the sealing member 120 can comprise silicon material. In this embodiment, the body 110 can comprise steel, aluminum, carbon fiber, plastic, polymer material and any combinations thereof.

FIG. 3 also illustrates an embodiment, wherein the body 110 and the sealing member 120 are made integral with each other and provided as a unitary, one-piece construction 136 entirely manufactured from such elastomeric or other suitable material. An optional abutment 138 can be provided to enhance sealing of the inlet opening 18.

The means 140 for biasing the body 110 for a contact and/or for a sealing engagement with the face frame 14, during use of the device 100 and in fastener-free manner between the body 110 and the face frame 14, is illustrated in FIGS. 2-8 as comprising a support member, or bracket, 150 and an elastic (and resilient) member 160. The support member 150, that can be also referred to as a brace, is sized and shaped to be positioned, during use of the device 100, in a contact with the inner surface 7 of the chamber 5 and adjacent the outlet opening 20 of the throat 8. The support member 150 is sized larger than the outlet opening 20 and, more particularly, sized larger either than at least one of a height or a width of the outlet opening 20. The elastic member 160 is being in a first connection with the support member 150 and in a second connection with the body 110. The elastic member 160 is further being in a tension during use of the device 100. By being in tension, it is understood that the elastic member 160 is stretched during and after installation of the device 100 into the pool skimmer 2 or during removal of the device 100 from the pool skimmer 2. The tension biases the body 110 for a sealing contact with the exterior surface 16 of the face frame 14 and biases the support member 150 for a direct contact with the inner surface 7 of the chamber 5. When the device 100 is removed, the elastic member 160 returns to its original state or may take some set due to aging.

In a first connection, the elastic member 160 has one end 162 thereof attached, either temporarily or permanently, to the support member 150 and has an opposite end 166 thereof attached, either temporarily or permanently, to the body 110. In an example or FIG. 2, the support member 150 can be adapted with a through aperture 152 and the end 162 of the elastic member 160 can be adapted with a flange or an abutment 164 being sized larger than the aperture 152 after the device 100 is installed. The aperture 152 can be sized so as to allow passage of the flange 164 being in a temporarily compressed state. Likewise, in the second connection, the body 110 and/or sealing member 120 can be adapted with a through aperture 118 and the opposite end 166 of the elastic member 160 can be adapted with a flange or an abutment 168 being sized larger than the aperture 118 after the device 100 is installed. The aperture 118 can be sized so as to allow passage of the flange 168 being in a temporarily compressed state. The end 162 and/or the end 166 can comprise a portion of the length of the elastic member 160 and not just a terminal end surface thereof.

In an example or FIG. 3, the support member 150 can be adapted with a through aperture 152 and the end 162 can be adapted with a flange or an abutment 164 being larger than the aperture 152. The aperture 152 can be sized so as to allow passage of the flange 164 being in a temporarily compressed state. In the second connection, the opposite end 166 is sized and shaped for insertion into a bore 134 in the body 110 and/or sealing member 120 and secured, after insertion, either by way of a frictional or interference fit, by way of an adhesive (not shown) or by way of a vulcanization.

In an example of FIG. 4, the support member 150 can be adapted with a through aperture 152, that can be also a partial bore, and the end 162 can be sized and shaped for insertion into the aperture or the bore 152 and secured, after insertion, either by way of a frictional or interference fit, by way of an adhesive (not shown) or by way of a vulcanization.

In an example, the end 162 can be attached to the surface of the support member 150, for example by a vulcanization process or by way of adhesive(s) (not shown) and without the use of aperture 152. Similarly, the opposite end 166 can be attached directly to the body 110 and/or to the sealing member 120 by a vulcanization process or by way of adhesive(s) (not shown) and without the use of aperture 118 or bore 134.

In an example, when the elastic member 160 is attached to the sealing member 120, it can be made integral therewith, for example during molding process, and provided as a unitary, one-piece construction.

The elastic member 160 can comprise a single material and be solid throughout or can be provided as a cord, comprising plurality of strings or strands encased in a jacket or even provided in exposed state. The elastic member 160 can be also referred to as an elastomer. The elastic member 160 can be any one of a natural rubber, a thermoset elastomer, a thermoplastic elastomer and any combination thereof. Without limitation, the elastic member 160 is of a material type that is used in sealing applications. The elastic member 160 can have any cross-sectional shape in a plane normal to a length thereof. Without limitations, such cross-section shape can be a round, a square, a rectangle, a tubular, a hexagon and the like.

Figure 6:
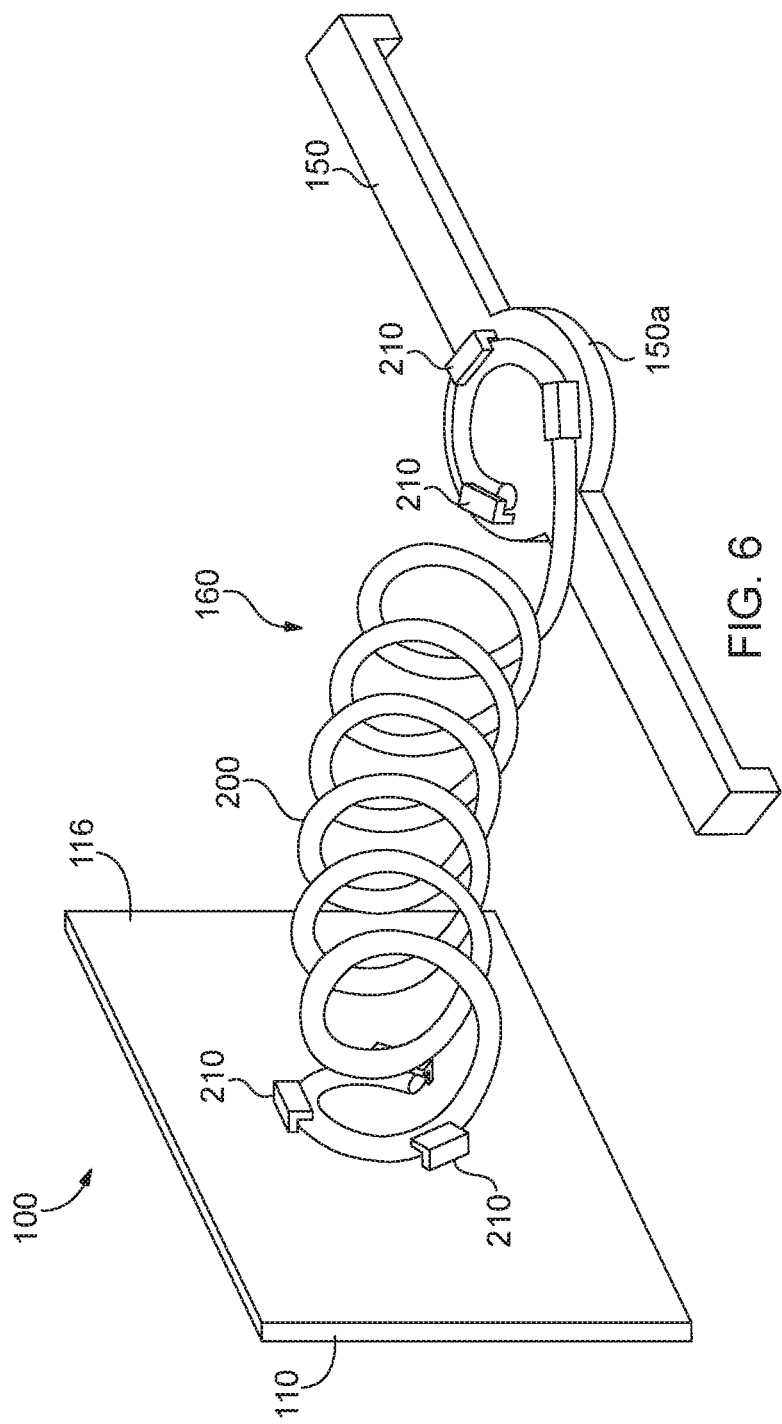
FIG. 6 illustrates an elevation view of an exemplary device configured to close the inlet opening of the swimming pool skimmer.

In an example of FIG. 6, the elastic member 160 can be provided as a coiled spring 200. The coil spring 200 can comprise a material being any one of metal, plastic, elastomer and any combination thereof. In a non-limiting example, the spring 200 can comprise a metallic material coated with a elastomeric material. To attach the spring 200, the inner surface 114 of the body 110 can be adapted with a seat, for example such as two or more tabs 210. Likewise, the support member 150 (rotated for clarity) can be adapted with two or more tabs 210 and even an enlarged portion 150*a* to accommodate the size of the spring 200.

Figure 7:
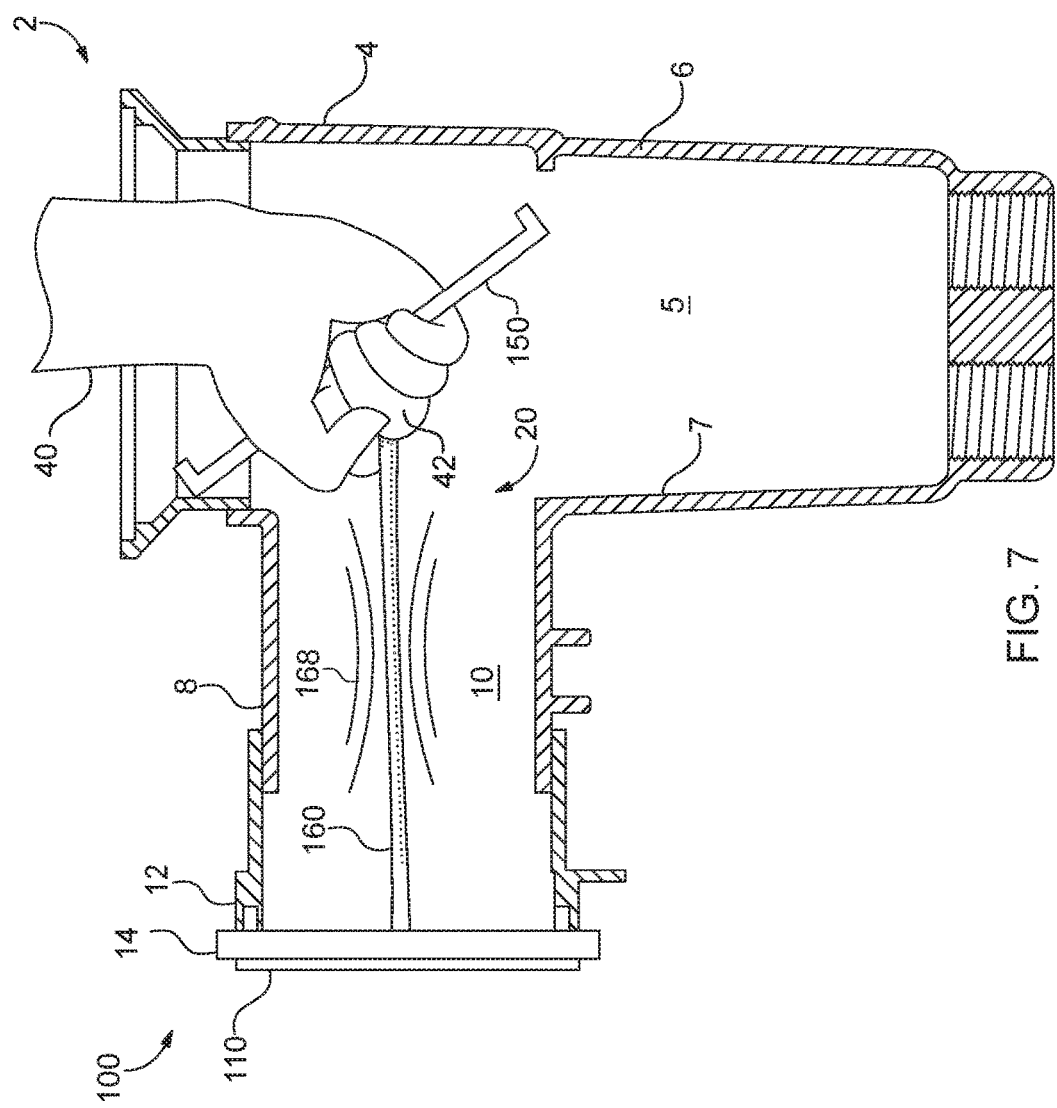
FIG. 7 illustrates a partial exemplary method of installing the exemplary devices of FIGS. 2-6 within the exemplary swimming pool skimmer of FIG. 1, shown in a cross-section.
Figure 13:
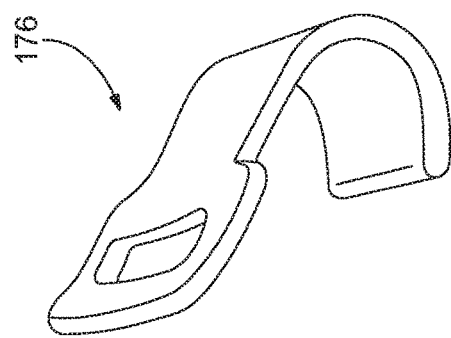
FIG. 13 illustrates a hook employed in the exemplary device of FIG. 12.
Figure 12:
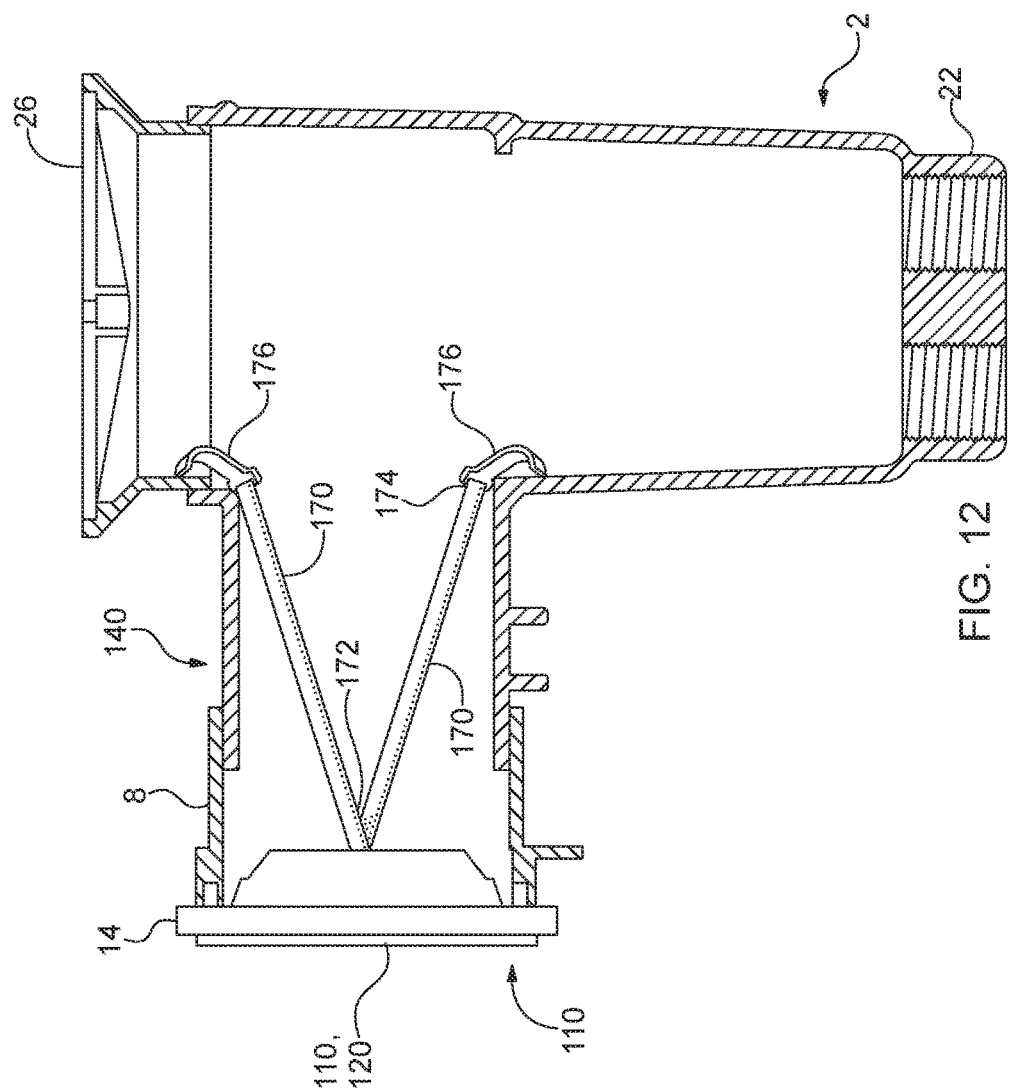
FIG. 12 illustrates an elevation view of an exemplary device configured to close the inlet opening of the exemplary swimming pool skimmer of FIG. 1, shown in a cross-section.

A method of closing the inlet opening 18 or sealing the face frame 16 with the device 100 of FIGS. 1-6, comprising the elastic member 160, is best illustrated in FIGS. 7-8. The method comprises providing the device 100 comprising the body 110 being sized larger, either with or without the sealing member 120, than the inlet opening 18, the support member 150 being sized larger than the outlet opening 20 and the elastic member 160 being in a first connection with the support member 150 and in a second connection with the body 110. Then, inserting the support member 150 into the hollow interior 10 of the throat 8. Next, grasping the support member 150 with fingers 42 of a hand 40 inserted through the chamber 5. Moving the support member 150 away from the body 110, by stretching the elastic member 160, into the chamber 5 through the outlet opening 20 so that the body 110 and/or the sealing member 120 contacts the exterior surface 16 of the face frame 14. Then, rotating, if necessary, the support member 150 inside the chamber 5. Next, moving the support member 150 toward the body 110 until the support member 150 contacts the inner surface 7 of the wall 6 adjacent the outlet opening 20, where a tension in the elastic member 160 biases the body 110 for a direct or indirect sealing contact with the exterior surface 16 of the face frame 14 and biases the support member 150 for a contact with the inner surface 7 of the chamber 5. The support member 150 is being illustrated as installed in a vertical direction but can be also installed in a horizontal direction or at any angle relative to the vertical or the horizontal direction. When the above described sealing member 120 is provided, the contact can be between such sealing member 120 and the face frame 14 or even between such sealing member 120 and a surface of the pool wall (not shown). It will be understood that the lid 26 is removed prior to installation of the device 100. The weir 24 can be also removed if required. The method can also comprise a step of attaching the elastic member 160 to any one of the body 110, sealing member 120 and to the support member 150 in an accordance with any of the above described embodiments or examples. The method can also comprise a step of attaching the sealing member 120 to the body 110 in an accordance with any of the above described embodiments or examples. The removal of the device 100 can be accomplished in an order of reversed steps.

Or, the installation method can be reversed by outwardly pulling the body 110 and/or sealing member 120 away from the face frame 14 to rest the support member 150 on the inner surface 7 and then releasing the body 110 and/or sealing member 120 for the abutting engagement with the face plate 14 or the surface of the swimming pool (not shown). After installation, the elastic member 160 remains under tension (stretched) to facilitate the sealing arrangement. It would be understood that the support member 150 is of a sufficient rigidity to withstand bending and/or distortion sufficient to break the seal and allow unacceptable leakage. The support member 150 can be rigid and can comprise a pair of flanges 158 or another reinforcing member. The support member 150 can be provided as an elongated member with a width sized sufficiently enough to receive the end of the member 160 while allow ease of being grasped by the hand 40. The support member 150 can be allowed to flex and even deform but not to a degree facilitating loss of the sealing arrangement or contact between the body 110 and/or sealing member 120 and the face frame 14 during use of the device 100.

In an embodiment of FIGS. 9-11, the means 140 can comprise an assembly or an arrangement 180 void of any elasticity or resiliency.

In an example of FIGS. 9-10, the assembly 180 comprises the above mentioned support member 150 adapted with a protrusion or an abutment, for example such as a tubular portion or a receptacle 192. The assembly 180 further comprises a complimentary member 196 having one end thereof attached, either temporarily or permanently, to the body 110 and/or the sealing member 120 and having the opposite end thereof configured for a frictional engagement with the tubular portion 192. The tubular portion 192 and the complimentary member 196 can be referred to as first and second members. After installation, the complimentary member 196 extends or protrudes from the body 110 and/or the sealing member 120 into the hollow interior 10. Such frictional engagement may comprise rigid or flexible external protrusions or barbs 198. To install the device 100 of FIGS. 10-11, the user grasps and positions the support member 150 inside the chamber 5 and inserts the barbs 198 into the tubular portion 192 while holding the support member 150 with one hand, for example such the hand 40. The user can hold the support member 150 through the opening in the top end of the pool skimmer 2 after the lid 26 is removed. The user can rotate or turn support member 150 if necessary. It would be understood that the tubular portion 192 and the member 196 can be reversed with the member 196 being attached to the support member 150. To remove the device 100 of FIGS. 10-11, the user can simply reach into the chamber 5, grasp the support member 150 with the hand 40 and pull the support member 150 in a direction away from the body 110. It would be understood that the frictional engagement is configured to allow disengagement of the complimentary member 196 from the tubular portion 192. It will be understood that the tubular portion 192 can be replaced by an aperture through the thickness of the support member 150, for example as the above described aperture 152, and the complimentary member 196 be allowed to protrude past the support member 150 into the chamber 5.

FIG. 10 also illustrate a pair of tabs 218, each, for example, having an L-shape configuration, that are disposed on the interior surface 7 of the chamber 5 so as to cage or retain the support member 150 during installation and use of the device 100. One of the tabs 218 can be positioned adjacent the flange 158, for example such as the upper flange so as to also retain the support member 150 in a vertical position of FIG. 10. The tabs 218 can remove the necessity for the user to hold the support member 150 during installation of removal of the device 100.

Thus, in an embodiment, a swimming pool skimmer 2 comprises a housing 4 comprising a wall 6, an open top, a partially closed bottom end, a chamber 5 defined within the housing 4, the chamber 5 comprising an interior surface 7 and accessible through the open top, and a conduit fitting 22 in the partially closed bottom end in a water flow communication with the chamber 5; a throat 8 extending from the housing 4, the throat 8 comprising a face frame 14 on an end 12 thereof, the face frame 14 having an exterior surface 16, an inlet opening 18 in the face frame 14 and an outlet opening 20 in the wall 6 of the housing 2 in a water flow communication with the chamber 5; a floating weir 24 positioned in the throat 8 to selectively pass water flow into the chamber 5; a lid 26 configured to selectively close the open top; and a pair of L-shaped tabs 218, each of the pair of L-shaped tabs 218 disposed on the interior surface 7 of the chamber 5 adjacent the outlet opening 20 and opposite each other relative to a pair of opposite edge of the outlet opening 20.

In an embodiment, the means 140 can partially comprise elastic or resilient properties. For example, the member 196 with or without barbs 198 can be at least partially if not completely manufactured from an elastomer sized and shaped to achieve the frictional engagement.

In an example of FIG. 11, the assembly 180 comprises the above mentioned support member 150 adapted with a tubular portion (that can be referred to as a first member) 192 having an internal or female thread 194, that can be also referred to as a first thread. The assembly 180 further comprises a member 196 (that can be referred to as a second member) passed through an aperture, for example such as the above described aperture 118, in the body 110 and/or the sealing member 120 and having an external or male thread 199 (that can be also referred to as a second thread) being complimentary to the thread 194 and in a threaded engagement therewith. During installation, the user partially threads the member 196, for example while holding the support member 150 within the chamber 5 with the hand 40 inserted through the top opening or retaining the support member 150 with the above described tabs 218 and then tightens the assembly 180, as the support member 150 is configured to prevent rotation within the threaded engagement chamber 5. It will be understood that the tubular portion 192 with the female thread 194 can be replaced by a female thread within the above described aperture 152. Alternatively, the threaded connection can be reversed where the male thread is on or within the support member 150 and the female thread is on or within the body 110. The body 110 can be simply rotated, during installation until a sufficient sealing arrangement is achieved. In an embodiment of FIGS. 12-13, the means 140 comprises two or more elastic and resilient members 170. Each member 170 has one end 172 thereof attached, either temporarily or permanently, to the body 110 and/or the sealing member 120. The opposite end 174 of each member 170 is attached to a hook 176. During use of the device 100, the hooks 176 are positioned to abut the inner surface 7 of the chamber adjacent the outlet opening 20 and the body 110 or the sealing member 120 are being in a sealing arrangement by way of tension in members 170. In an example, the members 170 have been illustrated as separate, distinct members. In an example, the members 170 can be connected along a length thereof into a unitary construction to define a common portion and individually movable ends or arms, each connected to a hook 176. The common portion does not have to be elastic and can be rigid, as long as sufficient tension is generated within the means 140 during use. Alternatively, the body 110 or the sealing member 120 can be adapted to couple to the hook 176, so that the member 170 can be provided as a strap with both ends terminated with a hook 176.

In an embodiment of FIG. 14, the means 140 can comprise a generally tubular member 220 that has one end thereof being coupled to the body 110, for example by a welding process.

Disposed within a hollow interior of the generally tubular member 220 is an elongated member 230 and a coiled spring 240 that is caged between an exterior surface of the elongated member 230 and an interior surface of the generally tubular member 220. The elongated member 230 is illustrated as being adapted with a flange 232 and the generally tubular member 220 is adapted with an end washer 226 so as to axially retain the spring 240. The free end of the elongated member 230 is coupled to a pin 250 that can be passed through an aperture 152 in the support member 150. The pin 250 can receive an enlargement 252. The aperture 152 and an exterior surface of the pin 250 can be sized so as to allow pivoting, and even a rotation, of the pin 250, as well as pivoting of the elongated member 230. To install the elongated member 230 and the spring 240, the generally tubular member 220 can be adapted with a cutout 222 that receives the spring 240 seated on the exterior surface of the elongated member 230 and guided into a position thorough a portion 224 of the generally tubular member 220. After the elongated member 230 is extended outwardly from the generally tubular member 220, the body 110 is positioned adjacent the face frame 14 so that the generally tubular member 220, elongated member 230 and spring 240 extend into the hollow interior 10. The pin 250 is then coupled to the free end of the elongated member 230 by any conventional arrangement, including without limitation a threaded engagement, a frictional engagement, an interlocking engagement and the like, by being first inserted into the chamber 5. The flange 232 and the washer 226 maintain compression of the spring 240 during use and therefore maintain the above described tension that biases the body 110 and/or elastomeric member 120 for a sealing abutment with the face frame 14 and the abutment of the support member 150 with the inner surface 7 of the chamber 5. Removal of the device 100 can be achieved by first uncoupling the pin 250 from the elongated member 230 and then removing the body 110 with the generally tubular member 220, the elongated member 230 and the spring 240. The device 100 of FIG. 14 can be provided without the elastomeric member 120 encasing the body 110. The support member 150 in this embodiment can be caged or retained with the above described tabs 218. The generally tubular member 220 can be threadably coupled to the body 110 (for example the above described aperture 118 can be threaded), allowing insertion of the elongated member 230 and the spring 240 prior to attaching the generally tubular member 220 to the body 110. The orientation and coupling of the generally tubular member 220 and the pin 250 can be reversed.

In any of the above described embodiments, the member 160 can be provided as a hollow member.

In any of the above embodiments, the support member 150 can be provided as an elongated support member, with a width and thickness thereof being sized so as to be grasped by a hand of the user during installation or removal of the device 100.

In any of the above embodiments, the device 100 is so configured that it is not necessary to fully compress either the body 110 or the sealing member 120 in order to achieve sufficient seal during use of the device 100. This partial compression, at least on a brand new devices 100, allows for aging of the device 100 and a repetitive use thereof.

In an embodiment, the elongated support member 150 has a length thereof being sized larger than a height or a width of the outlet opening 20, the elongated support member 150 has a width thereof being sized smaller than the height or said width of the outlet opening 20, so that the elongated support member can be manually grasped even when it abuts the inner surface 7 of the chamber 5.

In an embodiment, the device for winterizing or servicing the swimming pool skimmer can comprise a body or a face plate configured to at least cover the skimmer inlet opening and retained in a sealing arrangement with the swimming pool skimmer with one elastic member attached to a support member or a bracket.

It would be understood that the device 100 in an accordance with any of the above embodiments can be used for winterizing or servicing (for example such as removing and cleaning the debris basket (not shown) of the swimming pool skimmer 2. It is also within the scope of the disclosed subject matter that the device 100 is not limited to the swimming pool skimmer of FIG. 1 and further that the support member 150 is configured based on the internal geometry of the chamber 5 and can even include one or more bends or one or more curved portions.

In an embodiment, the device for winterizing or servicing the swimming pool skimmer can comprise a body or a face plate configured to at least cover the skimmer opening and retained in a sealing arrangement with the swimming pool skimmer with elastic members, each having an end thereof attached to a hook.

In an embodiment, the device for winterizing or servicing the swimming pool skimmer is configured to be installed and removed without tools, even as simple as a screwdriver.

In an embodiment, the device for winterizing or servicing the swimming pool skimmer is configured to accommodate temperature ranges without loss of sealing ability.

In an embodiment, the device for winterizing or servicing the swimming pool skimmer can comprise one or more elastomeric members configured to maintain sufficient tension after installation, thus at least preventing if not completely eliminating a loss of sealing arrangement between the device and the faceplate of the pool skimmer or between the device and the surface of the swimming pool.

In an embodiment, the device for winterizing or servicing the swimming pool skimmer is configured for multiple installation and removal cycles and is further configured to maintain sufficient tension after installation, thus at least preventing if not completely eliminating a loss of sealing arrangement.

In an embodiment, the unitary construction can comprise a recycle rubber material.

In an embodiment, the support member 150 or the straps 170 with the hooks 176 can be configured for use even when the user forgets to remove the weir 24.

In an embodiment, a device is provided to selectively close an inlet opening in a face frame of a throat in a pool skimmer, the throat having an outlet opening in a wall of the pool skimmer, the throat being in a water flow communication with the chamber, the chamber accessible through a removable lid. The device comprises a body; a support member sized and shaped to be positioned, during use of the device, in a contact with an interior surface of the chamber and adjacent the outlet opening of the throat; and an elastic member being in a first connection with the support member and in a second connection with the body, the elastic member further being in a tension during use of the device.

A feature of this embodiment is that the first connection comprises an aperture through a thickness of the support member, the aperture sized and shaped to receive a portion of the elastic member therethrough and an enlargement on one end of the elastic member, the enlargement sized and configured to abut a surface of the support member and cover the aperture through the thickness of the support member.

A feature of this embodiment is that the second connection comprises an aperture through a thickness of the body, the aperture sized and shaped to receive a portion of the elastic member therethrough and an enlargement on one end of the elastic member, the enlargement sized and configured to abut an exterior surface of the body and cover the aperture through the thickness of the body.

A feature of this embodiment is that the first connection comprises the second end of the elastic member being integral with the support member.

A feature of this embodiment is that the device comprises a sealing member, the sealing member secured either permanently or detachably to the body and positioned, during the use of the device, in a sealing contact with an exterior surface of the face frame or a surface of the swimming pool surrounding the face frame.

A feature of this embodiment is that the second connection comprises the first end of the elastic member being integral with the body.

A feature of this embodiment is that the body comprises an elastomeric material.

A feature of this embodiment is that the elastic member comprises a coiled spring.

A feature of this embodiment is that the body comprises a protrusion on a surface disposed, during the use of the device, adjacent a surface of the face frame, the protrusion being shaped to receive the inlet opening therewithin and contact the surface of the face frame.

A feature of this embodiment is that the body comprises a material being one of a metal, a plastic and a combination thereof and wherein the protrusion comprises an elastomeric material.

A feature of this embodiment is that the body comprises a base and an elastomeric material encasing the base, the base comprising a material being one of a metal, a plastic and a combination thereof.

A feature of this embodiment is that the body comprises an abutment sized to be received within a hollow interior of the throat.

A feature of this embodiment is that the support member is being shaped to be grasped by a user of the device during installation or removal of the device.

In an embodiment, a device is provided to selectively close an inlet opening in a face frame of a throat in a pool skimmer, the throat having an outlet opening in a wall of a chamber of the pool skimmer, the throat being in a water flow communication with the chamber, the chamber accessible through a removable lid. The device comprises a body sized; a support member sized and shaped to be positioned, during use of the device, in a contact with the wall of the chamber and adjacent the outlet opening of the throat; and an elastic member being in tension during use of the device, the elastic member further being in a first connection with the support member and in a second connection with the body; the tension biases the body for a contact with a surface of the face frame and biases the support member for the contact with the wall of the chamber.

In an embodiment, a device is provided that selectively closes an inlet opening in a face frame of a throat in a pool skimmer, the throat having an outlet opening in a wall of a chamber of the pool skimmer, the throat being in a water flow communication with the chamber, the chamber accessible through a removable lid. The device comprises a body sized larger than the inlet opening; and a means for providing a contact, during use of the device, between an interior surface portion of the body and an exterior surface of the face frame.

A feature of this embodiment is that the means comprises a support member sized and shaped to be positioned inside the chamber adjacent the outlet opening of the throat during the use of the device and a member connecting, in tension, the body to the support member.

A feature of this embodiment is that the member comprises an elastomer, a first end of the elastomer being in a first connection with the body and an opposite second end of the elastomer being in a second connection with the support member.

A feature of this embodiment is that the first connection comprises an aperture through a thickness of the body, the aperture sized and shaped to receive a portion of the elastomer therethrough and an enlargement on the first end of the elastomer, the enlargement sized and configured to abut an exterior surface of the body and cover the aperture through the thickness of the body.

A feature of this embodiment is that the second connection comprises an aperture through a thickness of the support member, the aperture sized and shaped to receive a portion of the elastomer therethrough and an enlargement on the second end of the elastomer, the enlargement sized and configured to abut a surface of the support member and cover the aperture through the thickness of the support member.

A feature of this embodiment is that the first connection comprises the first end of the elastomer being integral with the body.

A feature of this embodiment is that the second connection comprises the second end of the elastomer being integral with the support member.

A feature of this embodiment is that the means comprises a plurality of elastic members, each of the plurality of elastic members has one end thereof connected to the body; and a plurality of hooks, each hook from the plurality of hooks connected to an opposite end of a respective elastic member, the each hook being sized and shaped to contact the wall of the chamber adjacent the outlet opening.

A feature of this embodiment is that the means comprises a support member sized and shaped to be positioned inside the chamber adjacent the outlet opening of the throat during the use of the device, the support member comprising an aperture through a thickness thereof; a tubular member comprising one end thereof coupled to a surface of the body and a cut-out in a wall of the tubular member adjacent the one end; a washer secured to an opposite end of the tubular member; an elongated member partially disposed, during use of the apparatus within a hollow interior of the tubular member, the elongated member comprising a flange; a spring caged, during use of the device, between an exterior surface of the elongated member and an interior surface of the tubular member and between the flange and the washer; the cut-out being sized and shaped to pass the elongated member and the spring seated thereon; and a pin passed through the aperture and coupled, during use of the device to a free end of the elongated member.

In an embodiment, a device is provided that selectively closes an inlet opening in a face frame of a throat in a pool skimmer, the throat having an outlet opening in a wall of a chamber of the pool skimmer, the throat being in a water flow communication with the chamber, the chamber accessible through a removable lid. The device comprises a body; an elongated support member having a length thereof being sized larger than a height or a width of the outlet opening, the elongated support member having a width thereof being sized smaller than the height or the width of the outlet opening; and a means for biasing, during the use of the device and in fastener-free manner between the body and the face frame, the body into a direct contact only with a surface of the face frame and biasing the elongated support member into a direct contact only with the wall of the chamber adjacent the outlet opening of the throat.

A feature of this embodiment is that the means comprises a receptacle on the support member, the receptacle comprising a hollow interior; a protrusion on the body; and a frictional engagement between the protrusion and a wall of the hollow interior.

A feature of this embodiment is that the means comprises a protrusion on the support member; a receptacle on the body, the receptacle comprising a hollow interior; and a frictional engagement between the protrusion and a wall of the hollow interior.

A feature of this embodiment is that the means comprises a receptacle on the support member, the receptacle comprising a female thread; a protrusion on the body with an external male thread; and a threaded engagement between the female and male threaded portions.

A feature of this embodiment is that the means comprises a threaded engagement between the body and the elongated support member.

A feature of this embodiment is that the means comprises a frictional engagement between the body and the elongated support member.

A feature of this embodiment is that the means comprises a first member extending from the elongated support member, the elongated member comprising a first thread; and a second member extending from the body and being positioned during use of the device within the hollow interior of the throat, the second member comprising a second thread, the second thread being complimentary to the first thread so as to threadably connect the body to the elongated support member during use of the device.

A feature of this embodiment is that the means comprises a first member extending from the elongated support member; a second member extending from the body and being positioned during use of the device within the hollow interior of the throat; and a frictional engagement between the first member and the second member so as to frictionally connect the body to the elongated support member during use of the device.

A feature of this embodiment is that the frictional engagement comprises a cavity in one of the first and the second member and an opposite one of the first and second members being sized to frictionally engage the cavity.

A feature of this embodiment is that the opposite one of the first and second members comprises external protrusions contacting a peripheral wall of the cavity.

A feature of this embodiment is that the body comprises a base and a member encasing the base, the base comprising a material being one of a metal, a plastic and a combination thereof, the member comprising a material sufficient to at least prevent water flow into the inlet opening during the use of the device.

In an embodiment, a method of closing an inlet opening in a face frame of a throat in a pool skimmer, the throat having an outlet opening in a wall of a chamber of the pool skimmer, the throat being in a water flow communication with the chamber, the chamber accessible through a removable lid, the method comprises providing a device comprising a body, a support member being sized larger than the outlet opening and an elastic member being in a first connection with the support member and in a second connection with the body; inserting the support member into a hollow interior of the throat; grasping the support member through the chamber; moving the support member away from the body into the chamber through the outlet opening so that the body contacts a surface of the face frame; rotating the support member inside the chamber; and moving the support member toward the body until the support member contacts the wall of the chamber adjacent the outlet opening, where a tension in the elastic member biases the body for a contact with the surface of the face frame and biases the support member for a contact with the wall of the chamber.

In an embodiment, a device is provided to selectively close an inlet opening in a face frame of a throat in a pool skimmer, the throat having an outlet opening in a wall of a chamber of the pool skimmer, the throat being in a water flow communication with the chamber, the chamber accessible through a removable lid. The device comprises a face plate being sized larger than the inlet opening, the face plate comprising a body and a sealing member encasing a peripheral edge of the body or being disposed on a surface thereof; a support member sized and shaped to be positioned, during use of the device, in a contact with an interior surface of the chamber and adjacent the outlet opening of the throat; and an elastic member being in tension during use of the device, the elastic member further being in a first connection with the body and in a second connection with the support member; and the tension biases at least the sealing member for a sealing contact with an exterior surface of the face frame and biases the support member for the contact with the interior surface of the chamber.

The chosen exemplary embodiments of the present disclosure have been described and illustrated, to plan and/or cross section illustrations that are schematic illustrations of idealized embodiments, for practical purposes so as to enable any person skilled in the art to which it pertains to make and use the same. As such, variations from the shapes of the illustrations as a result, for example, of manufacturing techniques and/or tolerances, are to be expected. It is therefore intended that all matters in the foregoing description and shown in the accompanying drawings be interpreted as illustrative and not in a limiting sense. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope. It will be understood that variations, modifications, equivalents and substitutions for components of the specifically described exemplary embodiments of the invention may be made by those skilled in the art without departing from the spirit and scope of the invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, there is no intention to be bound by any expressed or implied theory presented in the preceding technical field, background, or the detailed description. It is also to be understood that the specific devices and processes illustrated in the coupled drawings, and described in the preceding specification, are simply examples of the inventive concepts.

It should be appreciated that reference throughout this specification to "one embodiment" or "an embodiment" means that a particular feature, structure or characteristic described in connection with the embodiment is included in at least one embodiment of the disclosed subject matter. Therefore, it is emphasized and should be appreciated that two or more references to "an embodiment" or "one embodiment" or "an alternative embodiment" in various portions of this specification are not necessarily all referring to the same embodiment or the same variation. Furthermore, the particular features, structures or characteristics may be combined as suitable in one or more embodiments of the disclosed subject matter.

Similarly, it should be appreciated that in the description of embodiments, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

Anywhere the term "comprising" is used, embodiments and components "consisting essentially of" and "consisting of" are expressly disclosed and described herein."

Furthermore, the Abstract is not intended to be limiting as to the scope of the claimed subject matter and is for the purpose of quickly determining the nature of the claimed subject matter.

What is claimed is:

1. A device that selectively closes an inlet opening in a face frame of a throat in a pool skimmer, the throat having an outlet opening in a wall of the pool skimmer, the throat being in a water flow communication with a chamber, the chamber accessible through a removable lid, said device comprising:
    a body positioned to close the inlet opening during use of said device;
    a support member sized and shaped to be positioned, during use of said device, in a contact with an interior surface of the chamber and adjacent the outlet opening of the throat; and
    an elastic member being in a first connection with said support member and in a second connection with said body, said elastic member further being stretched during said use of said device to bias said body into a sealing contact with the face frame and to bias said support member into said contact with the interior surface of the chamber.

2. The device of claim 1, wherein said first connection comprises an aperture through a thickness of said support member, said aperture sized and shaped to receive a portion of said elastic member therethrough and an enlargement on one end of said elastic member, said enlargement sized and configured to abut a surface of said support member and cover said aperture through said thickness of said support member.

3. The device of claim 1, wherein said second connection comprises an aperture through a thickness of said body, said aperture sized and shaped to receive a portion of said elastic member therethrough and an enlargement on one end of said elastic member, said enlargement sized and configured to abut an exterior surface of said body and cover said aperture through said thickness of said body.

4. The device of claim 1, wherein said first connection comprises said second end of said elastic member being integral with said support member.

5. The device of claim 1, wherein said second connection comprises said first end of said elastic member being integral with said body.

6. The device of claim 1, wherein said body comprises an elastomeric material.

7. The device of claim 1, wherein said elastic member comprises a coiled spring.

8. The device of claim 1, further comprising a sealing member, said sealing member secured either permanently or detachably to said body and positioned, during said use of said device, in a sealing contact with an exterior surface of the face frame or a surface of a swimming pool surrounding the face frame.

9. The device of claim 1, wherein said body comprises a material being one of a metal, a plastic and a combination thereof and a protrusion that comprises an elastomeric material.

10. The device of claim 1, wherein said body comprises a base and another member encasing said base, said base comprising a material being one of a metal, a plastic and a combination thereof, said another member comprising a material sufficient to at least prevent water flow into the inlet opening during said use of said device.

11. The device of claim 1, wherein said body comprises an abutment sized to be received within a hollow interior of the throat.

12. The device of claim 1, wherein said support member is being sized and shaped to be grasped by a user of said device during installation or removal of said device.

13. A device that selectively closes an inlet opening in a face frame of a throat in a pool skimmer, the throat having an outlet opening in a wall of a chamber of the pool skimmer, the throat being in a water flow communication with the chamber, the chamber accessible through a removable lid, said device comprising:
   a body being sized, shaped and positioned to close the inlet opening during use of said device; and
   an elastic means for providing a contact, during said use of said device, between an interior surface portion of said body and an exterior surface of the face frame, said elastic means comprises a support member sized and shaped to be positioned inside the chamber adjacent the outlet opening of the throat during said use of said device and a member connecting, in tension, said body to said support member, said member comprises an elastomer, a first end of said elastomer being in a first connection with said support member and an opposite second end of said elastomer being in a second connection with said body.

14. The device of claim 13, wherein said first connection comprises an aperture through a thickness of said support member, said aperture sized and shaped to receive a portion of said elastomer therethrough and an enlargement on said first end of said elastomer, said enlargement sized and configured to abut an exterior surface of said support member and cover said aperture through said thickness of said support member.

15. The device of claim 13, wherein said second connection comprises an aperture through a thickness of said body, said aperture sized and shaped to receive a portion of said elastomer therethrough and an enlargement on said second end of said elastomer, said enlargement sized and configured to abut a surface of said body and cover said aperture through said thickness of said body.

16. A device that selectively closes an inlet opening in a face frame of a throat in a pool skimmer, the throat having an outlet opening in a wall of a chamber of the pool skimmer, the throat being in a water flow communication with the chamber, the chamber accessible through a removable lid, said device comprises:
   a body positioned to close the inlet opening during use of said device;
   a plurality of elastic members, each of said plurality of elastic members has one end thereof connected to said body, said each of said plurality of elastic members being stretched during use of said device; and
   a plurality of hooks, each hook from said plurality of hooks connected to an opposite end of a respective elastic member, said each hook being sized and shaped to contact the wall of the chamber adjacent the outlet opening.

17. A device that selectively closes an inlet opening in a face frame of a throat in a pool skimmer, the throat having an outlet opening in a wall of a chamber of the pool skimmer, the throat being in a water flow communication with the chamber, the chamber accessible through a removable lid, said device comprising:
   a face plate being sized larger than the inlet opening, said face plate comprising a body and a sealing member encasing a peripheral edge of said body or being disposed on a surface thereof, said face plate being positioned to close the inlet opening during use of said device;
   a support member sized and shaped to be positioned, during use of said device, in a contact with an interior surface of the chamber and adjacent the outlet opening of the throat; and
   an elastic member being stretched during use of said device, said elastic member further being in a first connection with said support member and in a second connection with said body; and
   said elastic member biases by being stretched, during said use of said device, at least said sealing member for a sealing contact with an exterior surface of the face frame or a surface of a swimming pool and biases said support member for said contact with the interior surface of the chamber.

18. The device of claim 1, wherein said elastic member is an elastomer.

19. The device of claim 18, wherein said elastomer is any one of a natural rubber, a thermoset elastomer, a thermoplastic elastomer and any combination thereof.

20. The device of claim 1, wherein said elastic member is a coiled spring, wherein said first connection comprises two or more tabs on said body and wherein said second connection comprises two or more tabs on said support member.

21. A device that selectively closes an inlet opening in a face frame of a throat in a pool skimmer, the throat having an outlet opening in a wall of a chamber of the pool skimmer, the throat being in a water flow communication with the chamber, the chamber accessible through a removable lid, said device comprising:
   a body positioned to close the inlet opening during use of said device; and
   an elastic means for providing a contact, during said use of said device, between an interior surface portion of said body and an exterior surface of the face frame, said elastic means comprising:
      a support member sized and shaped to be positioned inside the chamber adjacent the outlet opening of the throat during said use of said device, said support member comprising an aperture through a thickness thereof, a tubular member comprising one end thereof coupled to a surface of said body and a cut-out in a wall of said tubular member adjacent said one end, a washer secured to an opposite end of said tubular member;

an elongated member partially disposed, during use of said apparatus within a hollow interior of said tubular member, said elongated member comprising a flange, a spring caged, during use of said device, between an exterior surface of said elongated member and an interior surface of said tubular member and between said flange and said washer, said cut-out being sized and shaped to pass said elongated member and said spring seated thereon, and a pin passed through said aperture and coupled, during use of said device to a free end of said elongated member.

\* \* \* \* \*